United States Patent
Min

(10) Patent No.: US 8,837,182 B2
(45) Date of Patent: Sep. 16, 2014

(54) APPARATUS AND METHOD FOR TRACKING MAXIMUM POWER POINT AND METHOD OF OPERATING GRID-TIED POWER STORAGE SYSTEM USING THE SAME

(75) Inventor: Byeong-Seon Min, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 335 days.

(21) Appl. No.: 13/073,673

(22) Filed: Mar. 28, 2011

(65) Prior Publication Data

US 2012/0062202 A1     Mar. 15, 2012

(30) Foreign Application Priority Data

Sep. 13, 2010    (KR) ........................ 10-2010-0089566

(51) Int. Cl.
*H02M 3/24*     (2006.01)
*G05F 1/67*     (2006.01)

(52) U.S. Cl.
CPC . *G05F 1/67* (2013.01); *Y02E 10/58* (2013.01); *Y10S 323/906* (2013.01)
USPC ............................................ 363/95; 323/906

(58) Field of Classification Search
CPC ...................... H02M 3/33507; H02M 7/53871; H02M 7/537; H02M 7/003; H02M 7/5387; H02M 7/538; H02M 3/33523; H02J 7/35; G05F 1/67
USPC ........................ 363/97, 98, 131, 132; 323/906
See application file for complete search history.

(56) References Cited

U.S. PATENT DOCUMENTS 4,375,662 A *   3/1983   Baker ............................... 363/95
5,235,266 A *   8/1993   Schaffrin ....................... 323/205

(Continued)

FOREIGN PATENT DOCUMENTS

KR    10-2002-0085185     * 11/2002
KR    10-2006-0072601 A    6/2006

(Continued)

OTHER PUBLICATIONS

In-Geun Yu et al. English Translation of Korean Publication No. 10-2002-0085185.*
Korean Office Action dated Nov. 22, 2011 issued in Korean Priority Application No. 10-2010-0089566, 5 pages.

*Primary Examiner* — Gary L Laxton
*Assistant Examiner* — Alex Torres-Rivera
(74) *Attorney, Agent, or Firm* — Christie, Parker & Hale, LLP

(57) ABSTRACT

An apparatus for tracking a maximum power point includes a converter unit for converting a first power, outputted from a solar cell module, into a second power and a maximum power point control unit for searching for a maximum power point voltage and an open-circuit voltage corresponding to a temperature and solar radiation of the solar cell module, decreasing voltage of the first power from the open-circuit voltage to the maximum power point voltage in a soft-start manner, and then performing Maximum Power Point Tracking (MPPT) control according to a Perturbation and Observation (P&O) algorithm.

19 Claims, 8 Drawing Sheets

(56) References Cited

U.S. PATENT DOCUMENTS

| | | | |
|---|---|---|---|
| 7,768,244 B2* | 8/2010 | Perol | 323/234 |
| 2005/0109386 A1* | 5/2005 | Marshall | 136/253 |
| 2006/0174939 A1* | 8/2006 | Matan | 136/293 |
| 2009/0091956 A1* | 4/2009 | Nocentini et al. | 363/65 |
| 2009/0316452 A1 | 12/2009 | Kim et al. | |
| 2010/0133911 A1* | 6/2010 | Williams et al. | 307/82 |
| 2010/0152917 A1* | 6/2010 | Kernahan | 700/297 |
| 2011/0282600 A1* | 11/2011 | Roesner et al. | 702/60 |

FOREIGN PATENT DOCUMENTS

| | | |
|---|---|---|
| KR | 1020080038868 A | 5/2008 |
| KR | 10-2008-0092747 A | 10/2008 |
| KR | 1020090024929 A | 3/2009 |
| KR | 10-2010-0000095 A | 1/2010 |

* cited by examiner

APPARATUS AND METHOD FOR TRACKING MAXIMUM POWER POINT AND METHOD OF OPERATING GRID-TIED POWER STORAGE SYSTEM USING THE SAME

CROSS-REFERENCE TO RELATED APPLICATION

This application claims priority to and the benefit of Korean Patent Application No. 10-2010-0089566, filed in the Korean Intellectual Property Office on Sep. 13, 2010, the entire content of which is incorporated herein by reference.

BACKGROUND

1. Field

Aspects of the present invention relate to method and apparatus for tracking a maximum power point and method of operating a grid-tied power storage system using the same.

2. Description of Related Art

Recently, the European Union has decided upon a plan to expand the percentage on the use of renewable energy sources, from among all electric power sources, to be up to 20% in the year 2020 and 50% in the year 2050. The United States is also planning to carry out Renewable Portfolio Standards (RPSs). In a situation where, among all the electric power sources, renewable energy use increases from less than 5% at today's level to 30 to 40% in the future, a power system should be prepared for the upcoming changes.

It is not easy to control the amount of generation of renewable energy. This is because the amount of generation of renewable energy fluctuates according to environmental conditions, such as solar power (e.g., solar lighting), wind power, and wave power. Research is being done on a scheme capable of overcoming degradation in the power quality of a power system and a mismatch between production and consumption times, which may occur because of the changing availability of renewable energy. Power quality is evaluated on the basis of voltage and frequency. If the supplied quantity of renewable energy does not coincide with the demanded quantity of renewable energy in real time, abnormalities are generated in voltage and frequency, thereby being capable of deteriorating the power quality of all power systems.

A power storage system has been considered as an alternative solution capable of managing the changing availability of renewable energy. This is because the power storage system can efficiently control demand and supply by storing electric energy when the amount of generation of renewable energy exceeds demand and discharging electric energy when the demand exceeds the amount of generation of renewable energy.

Power storage techniques include pumping-up power generation, Compressed Air Energy Storage (CAES), flywheel, Superconducting Magnetic Energy Storage (SMES), rechargeable battery, etc. The pumping-up power generation technique is a method of generating electricity by rotating a turbine by scooping up water in a dam when surplus electricity is available and discharging water from the dam when electricity is insufficient. The CAES technique is a method of generating electricity by compressing air in the ground or sea and then discharging the air as occasion demand to generate electricity. The flywheel technique is a method of generating electricity by rotating a top when electricity is left over and rotating a power generator using the top when electricity is insufficient. The SMES technique is a method using a principle that current can be stored in a superconducting coil having substantially zero resistance. The rechargeable battery technique is method of utilizing a battery that can be repeatedly charged and discharged and has been used in an Uninterruptible Power Supply (UPS) for temporarily supplying electricity upon a power failure. The rechargeable battery has recently been held in the spotlight as an auxiliary power of renewable energy system.

In solar power generation, power can be generated by installing solar cell modules on a house, a building, etc. However, Maximum Power Point Tracking (MPPT) control for extracting a maximum power has to be performed because the solar power generation has low power generation efficiency. In solar power generation, the efficiency of power generation can be determined according to how quickly a maximum power point is found and how stably the maximum power point is maintained on the basis of the MPPT control.

The above information disclosed in this Background section is only for enhancement of understanding of the background of the invention, and it may contain information that does not form the prior art that is already known in this country to a person of ordinary skill in the art.

SUMMARY

Aspects of embodiments according to the present invention are directed toward method and apparatus for tracking a maximum power point and method of operating a grid-tied power storage system using the same.

An apparatus for tracking a maximum power point according to an exemplary embodiment of the present invention includes a converter unit for converting a first power outputted from a solar cell module into a second power and a maximum power point control unit for searching for a maximum power point voltage and an open-circuit voltage corresponding to a temperature and solar radiation of the solar cell module, decreasing voltage of the first power from the open-circuit voltage to the maximum power point voltage in a soft-start manner, and then performing Maximum Power Point Tracking (MPPT) control according to a Perturbation and Observation (P&O) algorithm.

The apparatus may further include a Look-Up Table (LUT) unit for storing the maximum power point voltage and the open-circuit voltage as a function of the temperature and the solar radiation of the solar cell module. The maximum power point control unit may be configured to search the LUT unit for the maximum power point voltage and the open-circuit voltage corresponding to the temperature and solar radiation of the solar cell module.

The apparatus may further include a sensing unit for detecting the temperature and the solar radiation of the solar cell module and transmitting the detected temperature and the detected solar radiation to the maximum power point control unit.

The maximum power point control unit may be configured to regularly decrease an output voltage of the solar cell module to the maximum power point voltage by decreasing the output voltage per unit increment by a number of times of a system frequency during a soft start time.

The maximum power point control unit may be configured to periodically determine whether or not there is a variation in the first power according to the P&O algorithm, and the maximum power point control unit is configured to increase or decrease the output voltage by a set voltage when there is a variation in the first power so that the output voltage converges on the maximum power point voltage.

The set voltage may be set to a value smaller than the unit increment.

A method of tracking a maximum power point, according to another exemplary embodiment of the present invention, includes detecting a temperature and a solar radiation of a solar cell module, setting an open-circuit voltage and a maximum power point voltage corresponding to the detected temperature and the detected solar radiation of the solar cell module, regularly decreasing an output voltage of the solar cell module from the open-circuit voltage to the maximum power point voltage, and maintaining the output voltage at the maximum power point voltage according to a P&O algorithm.

The setting of the open-circuit voltage and the maximum power point voltage may include searching an LUT in which the maximum power point voltage and the open-circuit voltage as a function of the temperature and the solar radiation of the solar cell module are stored for the open-circuit voltage and the maximum power point voltage corresponding to the detected temperature and the detected solar radiation of the solar cell module.

The regularly decreasing of the output voltage of the solar cell module from the open-circuit voltage to the maximum power point voltage may include regularly decreasing the output voltage to the maximum power point voltage by decreasing the output voltage per unit increment by a number of times of a system frequency during a soft start time.

The maintaining of the output voltage at the maximum power point voltage according to the P&O algorithm may include periodically determining whether or not there is a variation in power output from the solar cell module and when there is a variation in the power output from the solar cell module, increasing or decreasing the output voltage by a set voltage so that the output voltage converges on the maximum power point voltage.

The set voltage may be set to a value smaller than the unit increment.

A method of operating a grid-tied power storage system, according to another exemplary embodiment of the present invention, includes detecting a temperature and a solar radiation of a solar cell module, setting an open-circuit voltage and a maximum power point voltage on the basis of the detected temperature and the detected solar radiation, and controlling a first power by regularly decreasing voltage of the first power from the open-circuit voltage to the maximum power point voltage in a soft-start manner, converting the first power into a second power, maintaining voltage of the second power at a DC link voltage, converting the second power at the DC link voltage into a third DC power, and charging a battery with the third DC power.

The controlling of the first power may include detecting a temperature and a solar radiation of the solar cell module and searching an LUT in which the maximum power point voltage and the open-circuit voltage as a function of the temperature and the solar radiation of the solar cell module are stored for the maximum power point voltage and the open-circuit voltage corresponding to the detected temperature and the detected solar radiation of the solar cell module.

The controlling of the first power may include decreasing the voltage of the first power to the maximum power point voltage by decreasing the voltage of the first power per unit increment by a number of times of a system frequency during a soft start time.

The controlling of the first power may further include decreasing the voltage of the first power to the maximum power point voltage and then maintaining the voltage of the first power at the maximum power point voltage according to a P&O algorithm.

A method of operating a grid-tied power storage system, according to another exemplary embodiment of the present invention, includes detecting a temperature and a solar radiation of a solar cell module, setting an open-circuit voltage and a maximum power point voltage on the basis of the detected temperature and the detected solar radiation, and controlling a first power by regularly decreasing voltage of the first power, outputted from the solar cell module, from the open-circuit voltage to the maximum power point voltage in a soft-start manner, converting the first power into a second power, maintaining voltage of the second power at a DC link voltage, converting the second power at the DC link voltage into a third AC power, and supplying the third AC power to at least one of a common grid or a load.

The controlling of the first power may include detecting a temperature and a solar radiation of the solar cell module and searching an LUT in which the maximum power point voltage and the open-circuit voltage as a function of the temperature and the solar radiation of the solar cell module are stored for the maximum power point voltage and the open-circuit voltage corresponding to the detected temperature and the detected solar radiation of the solar cell module.

The controlling of the first power may include regularly decreasing the voltage of the first power to the maximum power point voltage by decreasing the voltage of the first power per unit increment by a number of times of a system frequency during a soft start time.

The controlling of the first power may further include decreasing the voltage of the first power to the maximum power point voltage and then maintaining the voltage of the first power at the maximum power point voltage according to a P&O algorithm.

A maximum power point of solar power generation can be quickly searched for and stably maintained. Accordingly, the efficiency of solar power generation can be improved. Furthermore, the performance of a grid-tied power storage system associated with solar power generation can be improved.

DETAILED DESCRIPTION

Figure 1:
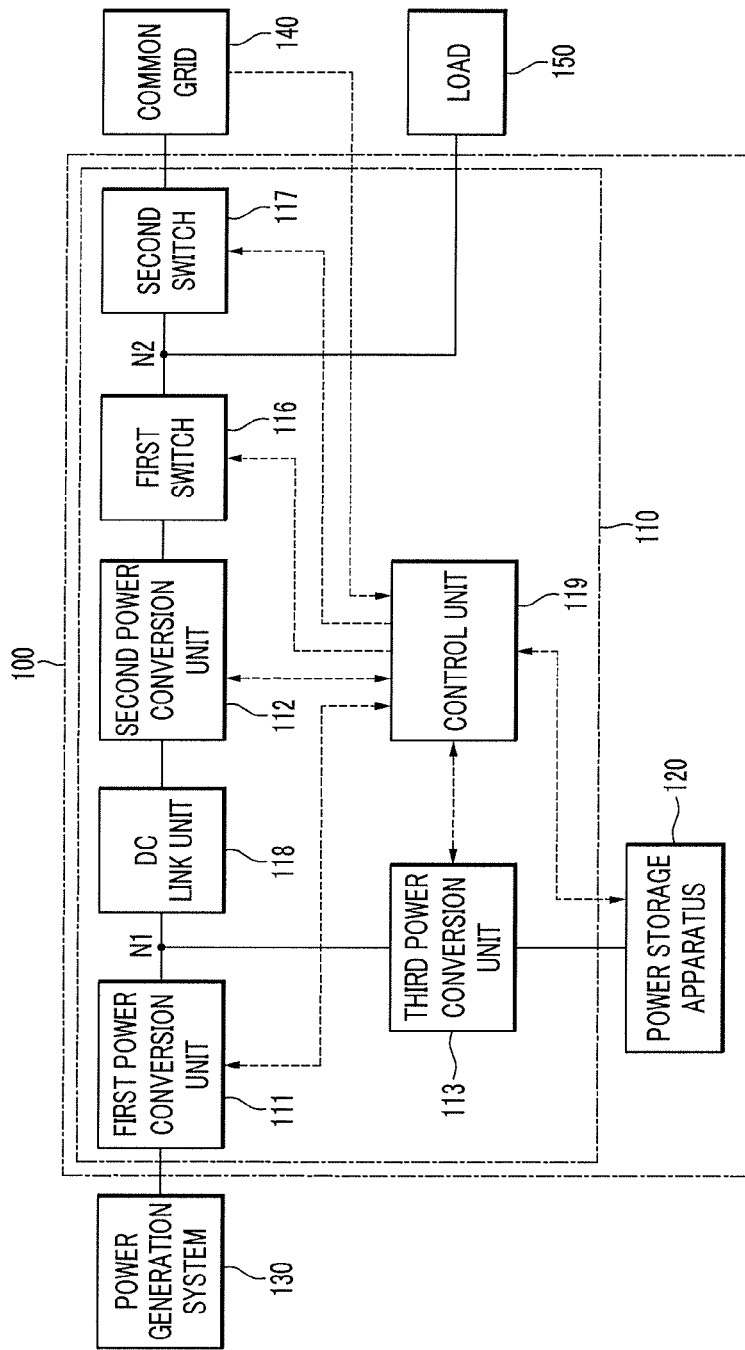
FIG. 1 is a block diagram showing a grid-tied power storage system according to an exemplary embodiment of the present invention.

Hereinafter, some exemplary embodiments of the present invention are described in more detail with reference to the accompanying drawings in order for those skilled in the art to be able to readily practice the present invention. As those skilled in the art would realize, the described embodiments may be modified in various different ways, all without departing from the spirit or scope of the present invention.

Furthermore, in some exemplary embodiments, constituent elements having the same construction are assigned the same reference numerals and are described in connection with a first exemplary embodiment as a representative example. In the remaining exemplary embodiments, only constituent elements different from those of the first exemplary embodiment are described.

In order to clarify a description of the present invention, parts not related to the description are omitted, and the same reference numbers are used throughout the drawings to refer to the same or like parts.

Throughout this specification and the claims that follow, when it is described that one element is "coupled (or connected)" to the other element, the one element may be "directly coupled (or connected)" to the other element or "electrically coupled (or connected)" to the other element through one or more third elements. In addition, unless explicitly described to the contrary, the word "comprise" and variations, such as "comprises" or "comprising," will be understood to imply the inclusion of stated elements but not the exclusion of any other elements.

FIG. 1 is a block diagram showing a grid-tied power storage system according to an exemplary embodiment of the present invention.

Referring to FIG. 1, the grid-tied power storage system 100 includes a power management system 110 and a power storage apparatus 120.

The grid-tied power storage system 100 is coupled to a power generation system 130, a common grid 140, and a load 150.

The power generation system 130 includes a system for producing electrical energy by using renewable energy, such as solar power (e.g., solar lighting), wind power, wave power, tidal power, and geothermal power. For example, a solar power generation system includes a solar cell module in which a plurality of solar cells for converting solar light into electrical energy is coupled in series or in parallel.

The common grid 140 includes a power station for producing electric power by using heat power, waterpower, or atomic power generation, and a substation or a power transmission site for changing the properties of voltage or current in order to transmit the produced power through a transmission line or a distribution line.

The load 150 refers to various electric devices which consume power. For example, the load may include consumer electronics and production facilities at factories.

The power management system 110 is a system for managing power of associated power grids, such as power of the power generation system 130, power of the common grid 140, and power of the power storage apparatus 120. The power management system 110 can manage a temporal mismatch between energy production and consumption of a power grid by using the power storage apparatus 120.

The power storage apparatus 120 includes a rechargeable battery that can be repeatedly charged and discharged. In one embodiment, the rechargeable battery includes a nickel-cadmium battery, a lead-acid battery, a nickel-hydrogen battery, a lithium-ion battery, a lithium polymer battery, etc. The power storage apparatus 120 may be a high-capacity storage device in which a plurality of rechargeable batteries are coupled in parallel or in series.

Here, a Battery Management System (hereinafter referred to as a "BMS") for controlling charging and discharging of a rechargeable battery may be included in the power storage apparatus 120 or the power management system 110. The BMS functions to protect the rechargeable battery from overcharge, over-discharge, over-current, or overheating by detecting a voltage, current, or temperature of the rechargeable battery, and the BMS monitors a State of Charge (hereinafter referred to as an "SOC") and State of Health (hereinafter referred to as an "SOH") of the rechargeable battery and improves the efficiency of the rechargeable battery through cell balancing.

The power management system 110 includes a first power conversion unit 111, a second power conversion unit 112, a third power conversion unit 113, a first switch 116, a second switch 117, a DC link unit 118, and a control unit 119.

The first power conversion unit 111 is coupled to the power generation system 130 and configured to convert a first power, generated by the power generation system 130, into a second power and transfer the second power to a first node N1. The first power generated by the power generation system 130 may be DC power or AC power. The second power of the first node N1 is DC power. That is, the first power conversion unit 111 may play the role of a converter for converting a first DC power into a second DC power having another magnitude or an inverter for converting a first AC power into a second DC power. The first power conversion unit 111 performs Maximum Power Point Tracking (hereinafter referred to as "MPPT") control for maximizing power generated by the power generation system 130. That is, the first power conversion unit 111 may be an MPPT converter having a maximum power point tracking function.

In a case where the power generation system 130 is a solar power generation system using solar cells, the first power conversion unit 111 searches a Look-Up Table (hereinafter referred to as an "LUT") for a maximum power point voltage Vmpp according to temperature and solar radiation of a solar cell module, sets the retrieved maximum power point voltage Vmpp, decreases voltage in a soft-start manner (e.g., gradually) from an open-circuit voltage Voc to the maximum power point voltage Vmpp, and then performs MPPT control according to a Perturbation and Observation (P&O) algorithm.

The DC link unit 118 is coupled to the first node N1 and configured to maintain a voltage level of the first node N1 at a DC link voltage level. The DC link unit 118 prevents or protects a voltage level of the first node N1 from becoming unstable because of a change in the output voltage of the power generation system 130, an instant voltage drop of the common grid 140, or the generation of a maximum load consumption of the load 150. Consequently, the second power conversion unit 112 and the third power conversion unit 113 can be normally operated. The DC link unit 118 may be a capacitor for DC link coupled in parallel between the first node N1 and the second power conversion unit 112. An aluminum electrolytic capacitor, a polymer capacitor, or a multilayer ceramic capacitor may be used as the capacitor for DC link.

The second power conversion unit 112 is coupled between the first node N1 and the second node N2. The common grid 140 and the load 150 are coupled to the second node N2. The second power conversion unit 112 converts the DC power of the first node N1 into AC power and transfers the AC power to the second node N2. Furthermore, the second power conversion unit 112 converts AC power of the second node N2 into DC power and transfers the DC power to the first node N1. That is, the second power conversion unit 112 can play the role of a bi-directional inverter for converting the DC power of the first node N1 and the AC power of the second node N2 in both directions. AC power to be supplied to the common grid 140 and the load 150 or AC power supplied from the common grid 140 is supplied through the second node N2.

The third power conversion unit 113 is coupled between the first node N1 and the power storage apparatus 120. The third power conversion unit 113 converts the second DC power, supplied from the first node N1, into a third DC power to be stored in the power storage apparatus 120 and transfers the third DC power to the power storage apparatus 120. Furthermore, the third power conversion unit 113 converts the third DC power, supplied from the power storage apparatus 120, into the second DC power and transfers the second DC power to the first node N1. That is, the third power conversion unit 113 can play the role of a bi-directional converter for converting the DC power of the first node N1 and the DC power of the power storage apparatus 120 in both directions.

The first switch 116 is coupled between the second power conversion unit 112 and the second node N2 and configured to cut off the flow of power between the second power conversion unit 112 and the second node N2. The second switch 117 is coupled between the second node N2 and the common grid 140 and configured to cut off the flow of power between the second node N2 and the common grid 140. A Field Effect Transistor (FET), a Bipolar Junction Transistor (BJT) or the like may be used as the first switch 116 or the second switch 117.

In particular, when an abnormality occurs in the common grid 140, the second switch 117 cuts off the supply of power to the common grid 140 such that the grid-tied power storage system 100 operates independently from the common grid 140. When the second switch 117 is opened, the grid-tied power storage system 100 is separated from the common grid 140 and thus can be independently operated by power of the power generation system 130 and the power storage apparatus 120. Accordingly, power output from the grid-tied power storage system 100 can be prevented or protected from being output to the common grid 140 in an abnormal state.

The control unit 119 controls the general operation of the power management system 110. The control unit 119 receives information (e.g., sensing signals related to voltage, current, and temperature) about power, generated by the power generation system 130, from the first power conversion unit 111, power storage information, including an SOC, an SOH, etc., from the power storage apparatus 120 (or a BMS), and grid information, including a voltage, current, temperature, etc. of a grid, from the common grid 140. The control unit 119 controls an operating mode of the power management system 110 on the basis of the information about power generated by the power generation system 130, the power storage information of the power storage apparatus 120, and the grid information of the common grid 140.

Furthermore, the control unit 119 receives sensing signals related to voltage, current, and temperature from the first power conversion unit 111, the second power conversion unit 112, and the third power conversion unit 113 and controls the power conversion efficiency of each of the power conversion units 111, 112, and 113 according to an operating mode of the power management system 110. The control unit 119 controls the on and off of the first switch 116 and the second switch 117 according to an operating mode of the power management system 110.

The operating modes of the power management system 110 are defined according to a power supply method on how power is supplied among two or more of the power storage apparatus 120, the power generation system 130, the common grid 140, and the load 150. The operating modes of the power management system 110 include (1) supplying power from the power generation system 130 to the power storage apparatus 120, (2) supplying power from the power generation system 130 to the common grid 140, (3) supplying power from the power generation system 130 to the load 150, (4) supplying power from the power storage apparatus 120 to the common grid 140, (5) supplying power from the power storage apparatus 120 to the load 150, (6) supplying power from the common grid 140 to the power storage apparatus 120, and (7) supplying power from the common grid 140 to the load 150.

In mode (1) when power is supplied from the power generation system 130 to the power storage apparatus 120, the control unit 119 transmits an off signal to the first switch 116, thereby cutting off the flow of the power from the first node N1 to the second node N2. The first power generated by the power generation system 130 is converted into the second DC power by the first power conversion unit 111. Voltage of the second DC power is stabilized at a DC link voltage level by the DC link unit 118. At this time, the first power conversion unit 111 sets a maximum power point voltage Vmpp by using an LUT, decreases voltage of the first power from an open-circuit voltage Voc to the maximum power point voltage Vmpp in a soft-start manner, and then performs MPPT control according to a P&O algorithm. The second power stabilized at the DC link voltage level is converted into the third DC power by the third power conversion unit 113 and then supplied to the power storage apparatus 120, thereby charging a rechargeable battery included in the power storage apparatus 120.

In mode (2), when power is supplied from the power generation system 130 to the common grid 140, the control unit 119 transmits an off signal to the third power conversion unit 113, thereby cutting off the flow of the power from the first node N1 to the power storage apparatus 120. The control unit 119 transmits an on signal to the first switch 116 and the second switch 117. The first power generated by the power generation system 130 is converted into the second DC power by the first power conversion unit 111. Voltage of the second power is stabilized at a DC link voltage level by the DC link unit 118. At this time, the first power conversion unit 111 sets a maximum power point voltage Vmpp by using an LUT, decreases voltage of the first power from an open-circuit voltage Voc to the maximum power point voltage Vmpp in a soft-start manner, and then performs MPPT control according to a P&O algorithm. The second power stabilized at the DC link voltage level is converted into AC power by the second power conversion unit 112 and then supplied to the common grid 140. Here, the second power conversion unit 112 outputs the AC power which conforms to power quality criteria, such as the Total Harmonic Distortion (THD), power factor, etc., of voltage and current for the common grid 140.

In mode (3), when power is supplied from the power generation system 130 to the load 150, the control unit 119 transmits an off signal to the third power conversion unit 113 and the second switch 117, thereby cutting off the flow of the power from the first node N1 to the power storage apparatus 120 and the common grid 140. The control unit 119 transmits an on signal to the first switch 116. The first power generated by the power generation system 130 is converted into the second DC power by the first power conversion unit 111. Voltage of the second power is stabilized at a DC link voltage level by the DC link unit 118. At this time, the first power conversion unit 111 sets a maximum power point voltage Vmpp by using an LUT, decreases voltage of the first power from an open-circuit voltage Voc to the maximum power point voltage Vmpp in a soft-start manner, and then performs MPPT control according to a P&O algorithm.

The second power stabilized at the DC link voltage level of the first node N1 is converted into AC power by the second power conversion unit 112 and then supplied to the load 150. Since the load 150 is configured to use AC power of the common grid 140, the second power conversion unit 112 outputs AC power to the load 150 that conforms to power quality criteria for the common grid 140.

In mode (4), when power is supplied from the power storage apparatus 120 to the common grid 140, the control unit 119 transmits an on signal to the first switch 116 and the second switch 117. DC power of an output voltage level, outputted by the power storage apparatus 120, is converted into DC power of a DC link voltage level by the third power conversion unit 113 and then stabilized by the DC link unit 118. The power stabilized at the DC link voltage level of the first node N1 is converted into AC power by the second power conversion unit 112 and then supplied to the common grid 140.

In mode (5), when power is supplied from the power storage apparatus 120 to the load 150, the control unit 119 transmits an on signal to the first switch 116 and transmits an off signal to the second switch 117. DC power of an output voltage level, outputted by the power storage apparatus 120, is converted into DC power of a DC link voltage level by the third power conversion unit 113 and then stabilized by the DC link unit 118. The power stabilized at the DC link voltage level of the first node N1 is converted into AC power by the second power conversion unit 112 and then supplied to the load 150.

In mode (6), when power is supplied from the common grid 140 to the power storage apparatus 120, the control unit 119 transmits an on signal to the first switch 116 and the second switch 117. AC power of the common grid 140 is converted into DC power of a DC link voltage level by the second power conversion unit 112. The DC power of a DC link voltage level of the first node N1 is converted into DC power of a voltage level (suitable for the power storage apparatus 120 to store power) by the third power conversion unit 113 and then supplied to the power storage apparatus 120.

In mode (7), when power is supplied from the common grid 140 to the load 150, the control unit 119 transmits an off signal to the first switch 116 and an on signal to the second switch 117. Accordingly, AC power of the common grid 140 is supplied to the load 150.

The operating modes of the power management system 110 have been illustrated and separated according to a power supply method among the power storage system 120, the power generation system 130, the common grid 140, and the load 150, but the power supply methods may be performed in combination. Accordingly, the operating mode of the power management system 110 may be configured in various ways. For example, power may be supplied from the power generation system 130 to the power storage apparatus 120 and the load 150, or power may be supplied from the power generation system 130 and the power storage apparatus 120 to the load 150. In some embodiments, power may be supplied from the power generation system 130 and the power storage apparatus 120 to the common grid 140 and the load 150.

Figure 2:
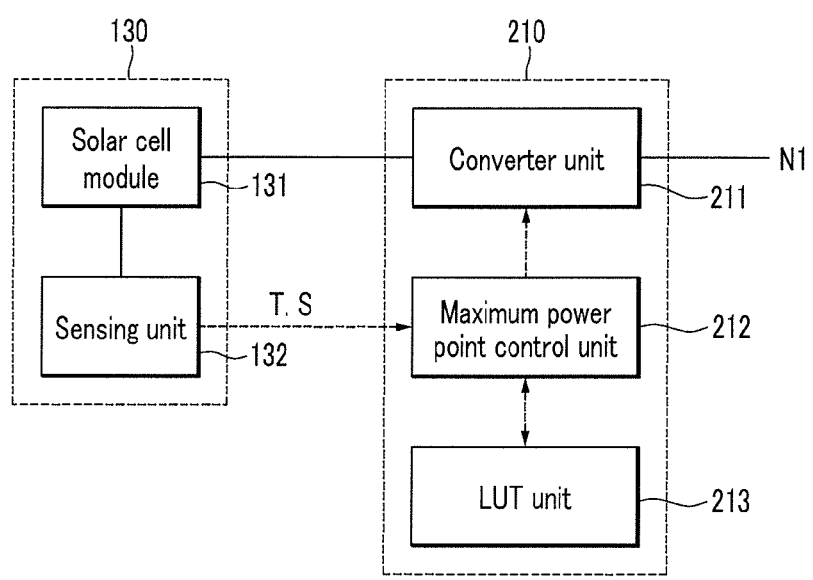
FIG. 2 is a block diagram showing a Maximum Power Point Tracking (MPPT) converter having a maximum power point tracking function according to an exemplary embodiment of the present invention.

FIG. 2 is a block diagram showing an MPPT converter having a maximum power point tracking function according to an exemplary embodiment of the present invention.

Referring to FIG. 2, in the grid-tied power storage system 100 according to the exemplary embodiment as shown in FIG. 1, in a case where the power generation system 130 is a solar power generation system, an MPPT converter 210 can perform MPPT control and, at the same time, convert power generated by the solar power generation system into power of a DC link voltage level.

As shown in FIG. 2, the power generation system 130 includes a solar cell module 131 and a sensing unit 132. The solar cell module 131 includes a plurality of solar cells coupled in series or in parallel. The sensing unit 132 detects a temperature T and solar radiation S of the solar cell module 131.

The MPPT converter 210 includes a converter unit 211, a maximum power point control unit 212, and an LUT unit 213.

The converter unit 211 is coupled to the solar cell module 131 and configured to convert first power, output from the solar cell module 131, into second power of a set or predetermined voltage level. The second power may have a DC link voltage level.

A characteristic of the power generated by the solar cell module 131 changes according to temperature T and solar radiation S of the solar cell module 131. The power of the solar cell module 131 is represented by voltage and current and is characterized in that as voltage increases, current remains constant and then rapidly decreases at a specific voltage or higher. That is, the power of the solar cell module 131 rises with an increase of voltage and then rapidly decreases at a specific voltage (e.g., a maximum power point voltage Vmpp) or higher. The maximum power of the solar cell module 131 is characterized in that it decreases with an increase of the temperature T, but increases with an increase of the solar radiation S.

A graph showing the voltage and current characteristic of the solar cell module 131 according to the temperature T and the solar radiation S can be produced. An open-circuit voltage Voc and a maximum power point voltage Vmpp can be found in this graph.

The LUT unit 213 stores the power characteristic of the solar cell module 131 according to the temperature T and the solar radiation S. In one embodiment, the LUT unit 213 forms a table to have the maximum power point voltage Vmpp and the open-circuit voltage Voc according to (as a function of) the temperature T and the solar radiation S of the solar cell module 131 and store this table.

The maximum power point control unit 212 performs MPPT control so that output voltage of the solar cell module 131 maintains the maximum power point voltage Vmpp. The maximum power point control unit 212 receives information about the temperature T and the solar radiation S of the solar cell module 131 from the sensing unit 132 and searches the LUT unit 213 for a maximum power point voltage Vmpp and an open-circuit voltage Voc corresponding to the temperature T and the solar radiation S of the solar cell module 131. The maximum power point control unit 212 decreases voltage of the first power from the open-circuit voltage Voc to the maximum power point voltage Vmpp in a soft-start manner and performs MPPT control according to a P&O algorithm. The maximum power point control unit 212 can measure an output voltage and current of the solar cell module 131 and determine an output power of the solar cell module 131 on the basis of the measured output voltage and current.

Although the sensing unit 132 is illustrated to be included in the power generation system 130, the sensing unit 132, together with the MPPT converter 210, may be included in an MPPT apparatus.

A method of tracking a maximum power point by using an LUT in which maximum power point voltages Vmpp and open-circuit voltages Voc according to temperature T and solar radiation S of the solar cell module 131 are stored is described below with reference to FIGS. 3 to 6.

Figure 3:
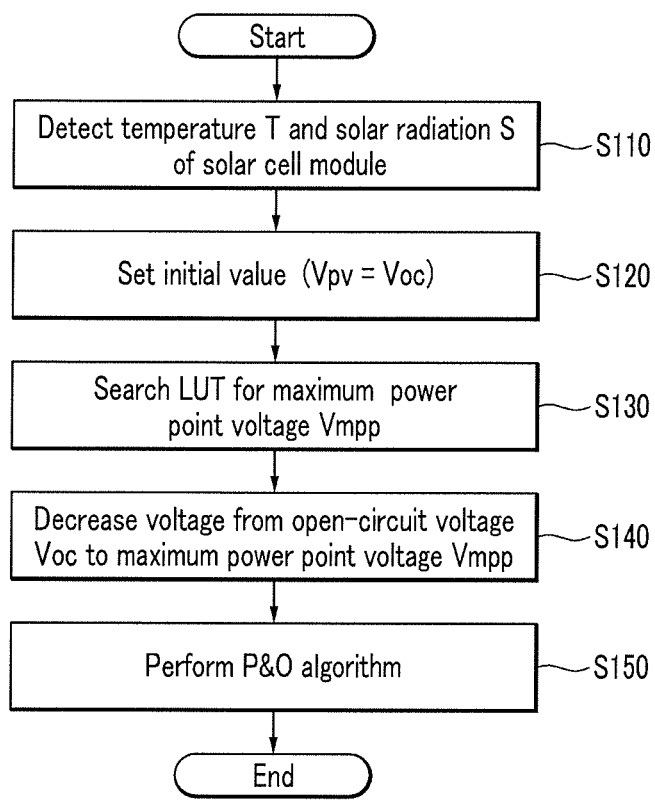
FIG. 3 is a flowchart illustrating a method of tracking a maximum power point according to an exemplary embodiment of the present invention.
Figure 4:
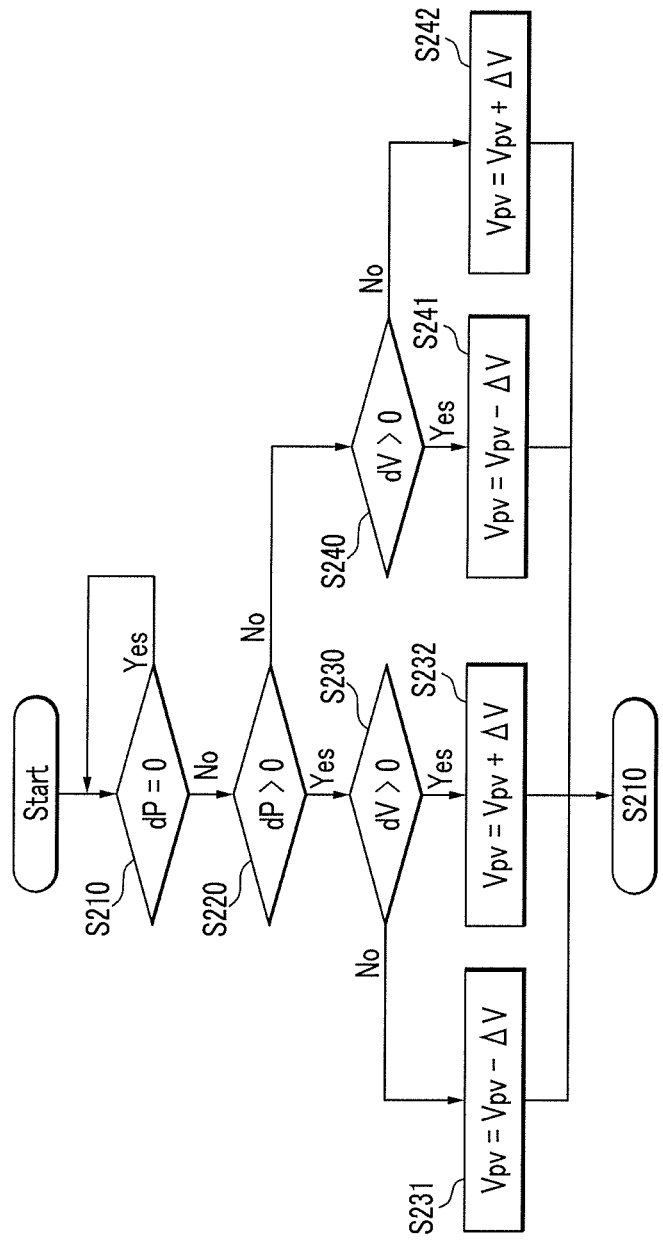
FIG. 4 is a flowchart illustrating a Perturbation and Observation (P&O) algorithm in the method of tracking a maximum power point shown in FIG. 3.
Figure 5:
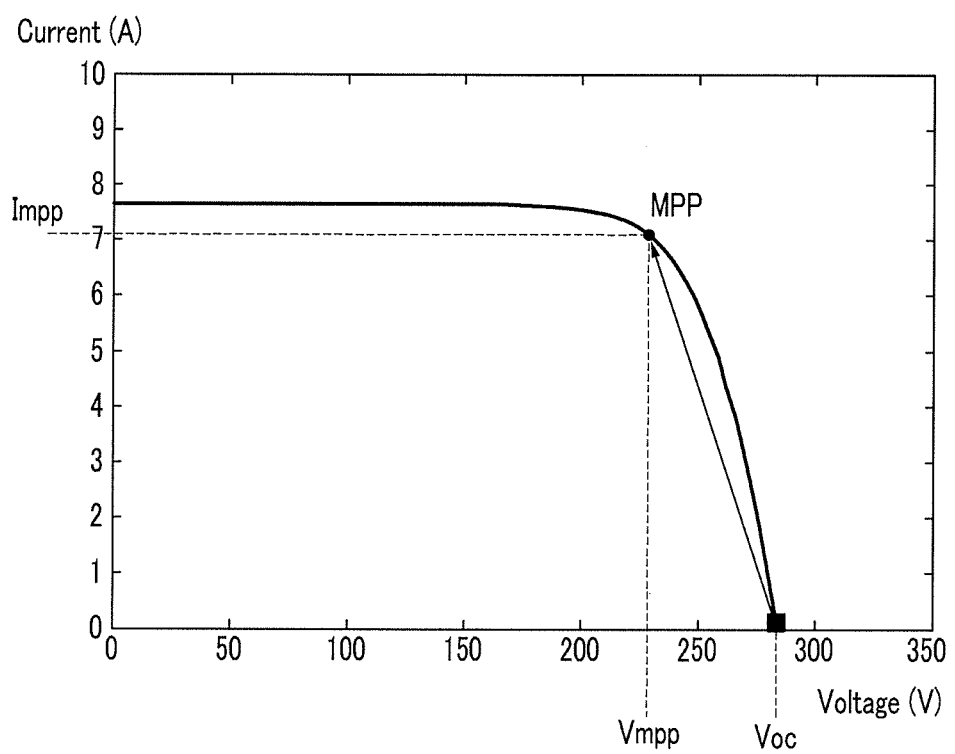
FIG. 5 shows an example of a current-voltage graph of a solar cell module.
Figure 6:
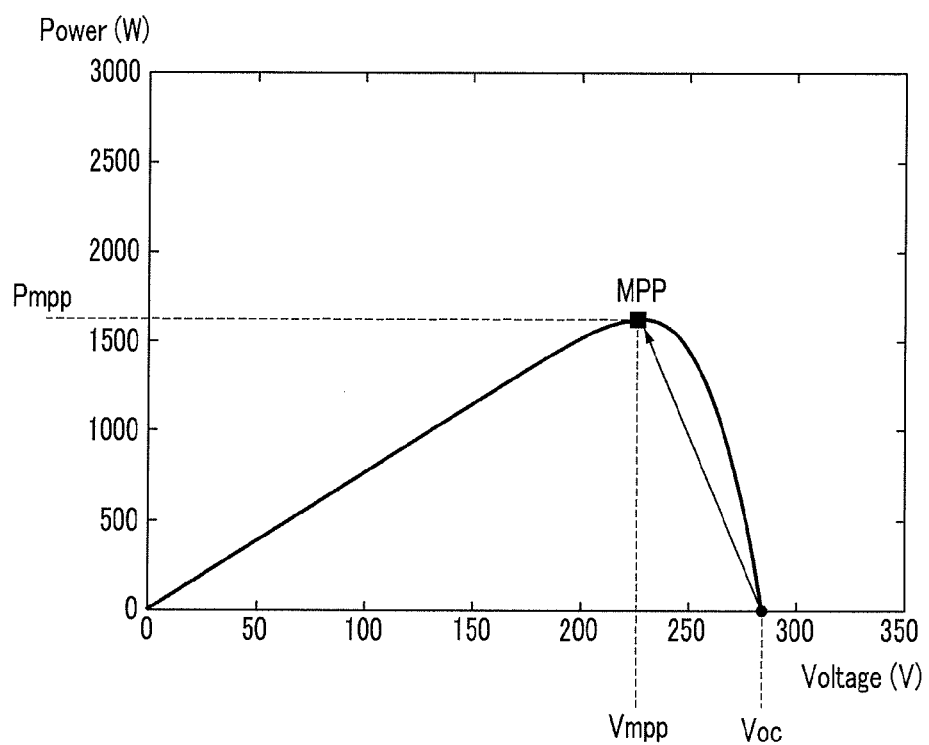
FIG. 6 shows an example of a power-voltage graph of the solar cell module.

FIG. 3 is a flowchart illustrating the method of tracking a maximum power point according to an exemplary embodiment of the present invention. FIG. 4 is a flowchart illustrating a P&O algorithm in the method of tracking a maximum power point shown in FIG. 3. FIG. 5 shows an example of a current-voltage graph of the solar cell module. FIG. 6 shows an example of a power-voltage graph of the solar cell module.

Referring to FIGS. 3 to 6, the sensing unit 132 detects a temperature T and solar radiation S of the solar cell module 131 at step S110. The sensing unit 132 transmits information about the temperature T and solar radiation S of the solar cell module 131 to the maximum power point control unit 212.

The maximum power point control unit 212 sets an open-circuit voltage Voc, corresponding to the temperature T and the solar radiation S, as an initial value at step S120. The maximum power point control unit 212 may search the LUT unit 213 for the open-circuit voltage Voc corresponding to the temperature T and the solar radiation S of the solar cell module 131. For example, the maximum power point control unit 212 may determine that the open-circuit voltage Voc, in a case where the temperature T of the solar cell module 131 is 25° C. and the solar radiation S thereof is 100%, is 284.2 V from the LUT unit 213.

The graph of FIG. 5 shows a current-voltage graph of the solar cell module 131 in a case where the temperature T of the solar cell module 131 is 25° C. and the solar radiation S thereof is 100%. From the graph, it can be seen that the open-circuit voltage Voc is 284.2 V.

The maximum power point control unit 212 searches the LUT unit 213 for a maximum power point voltage Vmpp corresponding to the temperature T and the solar radiation S and sets the retrieved maximum power point voltage Vmpp at step S130. For example, the maximum power point control unit 212 may determine that the maximum power point voltage Vmpp, in a case where the temperature T of the solar cell module 131 is 25° C. and the solar radiation S thereof is 100%, is 226.8 V from the LUT unit 213.

The graph of FIG. 6 shows a power-voltage graph of the solar cell module 131 in a case where the temperature T of the solar cell module 131 is 25° C. and the solar radiation S thereof is 100%. From the graph, it can be seen that the maximum power point voltage Vmpp is 226.8 V.

The maximum power point control unit 212 decreases the output voltage of the solar cell module 131 (i.e., the input voltage of the converter unit 211) from the open-circuit voltage Voc to the maximum power point voltage Vmpp in a soft-start manner at step S140.

Equation 1 represents the soft-start method of decreasing the output voltage of the solar cell module 131 from the open-circuit voltage Voc to the maximum power point voltage Vmpp.

$$Vpv(k)=Vpv(k-1)-Vdelt,$$

$$Vdelt(Voc-Vmpp)/(Tss\times Fs) \quad \text{(Equation 1)}$$

where Vpv indicates the output voltage of the solar cell module 131, Tss indicates a soft start time, Fs indicates a system frequency, and Vdelt indicates a unit increment to decrease the output voltage Vpv of the solar cell module 131. For example, in a case where the temperature T of the solar cell module 131 is 25° C. and the solar radiation S thereof is 100%, assuming that the open-circuit voltage Voc is 284.2 V, the maximum power point voltage Vmpp is 226.8 V, the soft start time Tss is 1 second, and the system frequency Fs is 1.5 kHz, the unit increment Vdelt is (284.2-226.8)/(1×15000) =0.00383 V.

That is, the maximum power point control unit 212 decreases the output voltage Vpv of the solar cell module 131 per unit increment Vdelt by the number of times of the system frequency Fs during the soft start time Tss so that the output voltage Vpv is finally decreased to the maximum power point voltage Vmpp. This means that during the soft start time Tss, the output voltage Vpv of the solar cell module 131 is regularly decreased from the open-circuit voltage Voc to the maximum power point voltage Vmpp (refer to FIGS. 5 and 6). This also means that during the soft start time Tss, current flowing from the solar cell module 131 to the converter unit 211 is regularly increased from 0 to a maximum power point current Impp (refer to FIG. 5). Furthermore, this means that during the soft start time Tss, power of the solar cell module 131 is regularly increased from 0 to a maximum power point power Pmpp (refer to FIG. 6).

The output voltage Vpv of the solar cell module 131 (i.e., the input voltage of the converter unit 211) is regularly decreased from the open-circuit voltage Voc to the maximum power point voltage Vmpp in a soft-start manner. Accordingly, instantaneously high current can be prevented or protected from flowing through the converter unit 211, and current can stably flow from the solar cell module 131 to the power management system 110.

After decreasing the output voltage Vpv of the solar cell module 131 from the open-circuit voltage Voc to the maximum power point voltage Vmpp, the maximum power point control unit 212 performs a P&O algorithm so that the output voltage Vpv of the solar cell module 131 is maintained at the maximum power point voltage Vmpp at step S150. The P&O algorithm is a method of periodically comparing a current output power and a previous output power of the solar cell module 131, and increasing or decreasing the output voltage Vpv of the solar cell module 131 on the basis of a result of the comparison so that the output power of the solar cell module 131 becomes the maximum output point power Pmpp.

In one embodiment, the P&O algorithm may be performed as shown in FIG. 4.

Referring to FIG. 4, the maximum power point control unit 212 determines whether or not a variation dP of output power of the solar cell module 131 is equal to 0 at step S210. The maximum power point control unit 212 determines whether or not there is a variation in the output power of the solar cell module 131 by periodically measuring an output voltage and current of the solar cell module 131 and calculating the output power on the basis of the measured output voltage and current.

If, as a result of the determination at step 210, the variation dP of output power of the solar cell module 131 is determined to be nonzero (i.e., there is a variation in the output power), the maximum power point control unit 212 determines whether or not the variation dP of the output power is positive at step S220.

If, as a result of the determination at step S220, the variation dP of the output power is determined to be positive, the maximum power point control unit 212 determines whether or not a variation dV of an output voltage of the solar cell module 131 is positive at step S230. Furthermore, when the variation dP of the output power is determined not to be positive as a result of the determination at step S220, the maximum power point control unit 212 determines whether or not the variation dV of an output voltage of the solar cell module 131 is positive at step S240.

If, as a result of the determination at steps S220 and S230, the variation dP of an output power of the solar cell module 131 is determined to be positive and the variation dV of an output voltage of the solar cell module 131 is determined not to be positive (i.e., dP>0 and dV=0), the maximum power point control unit 212 decreases the output voltage Vpv of the solar cell module 131 by ΔV (i.e., Vpv=Vpv−ΔV) at step S231.

If, as a result of the determination at steps S220 and S230, the variation dP of an output power of the solar cell module 131 is determined to be positive and the variation dV of an output voltage of the solar cell module 131 is determined to be positive (i.e., dP>0 and dV>0), the maximum power point control unit 212 increases the output voltage Vpv of the solar cell module 131 by ΔV (i.e., Vpv=Vpv+ΔV) at step S232.

If, as a result of the determination at steps S220 and S240, the variation dP of an output power of the solar cell module 131 is determined not to be positive and the variation dV of an output voltage of the solar cell module 131 is determined to be positive (i.e., dP=0 and dV>0), the maximum power point control unit 212 decreases the output voltage Vpv of the solar cell module 131 by ΔV (i.e., Vpv=Vpv−ΔV) at step S241.

If, as a result of the determination at steps S220 and S240, the variation dP of an output power of the solar cell module 131 is determined not to be positive and the variation dV of an output voltage of the solar cell module 131 is determined not to be positive (i.e., dP=0 and dV=0), the maximum power point control unit 212 increases the output voltage Vpv of the solar cell module 131 by ΔV (i.e., Vpv=Vpv+ΔV) at step S242.

That is, the maximum power point control unit 212 increases or decreases the output voltage Vpv of the solar cell module 131 by 0V so that the output voltage Vpv of the solar cell module 131 converges on the maximum power point voltage Vmpp, and then checks whether or not there is a variation in the output power of the solar cell module 131 according to a predetermined cycle.

The output voltage Vpv of the solar cell module 131 is increased or decreased per cycle by ΔV, which may be set to a value smaller than the unit increment Vdelt. That is, ΔV may be set to "Vdelt×G" (0<G<1). Since G is set to a value which is greater than 0, but smaller than 1, changes in the output voltage Vpv of the solar cell module 131 at the maximum power point MPP can be reduced.

If the P&O algorithm is applied at the beginning when the solar cell module 131 begins to output power to the power management system 110, errors, such as measurement errors of current and voltage, are generated and much operation processing is required, during the time for which the output reaches from the open-circuit voltage Voc to the maximum power point voltage Vmpp. Consequently, it takes a long time to find a Maximum Power Point (MPP) of the solar cell module 131.

Using the above proposed method of storing the maximum power point voltage Vmpp and the open-circuit voltage Voc determined on the basis of the temperature T and solar radiation S of the solar cell module 131 in an LUT, decreasing the output voltage Vpv of the solar cell module 131 from the open-circuit voltage Voc to the maximum power point voltage Vmpp in a soft-start manner by using the LUT, and then performing MPPT control according to the P&O algorithm, the output voltage can quickly reach the maximum power point voltage Vmpp at the early stage without error.

Figure 7:
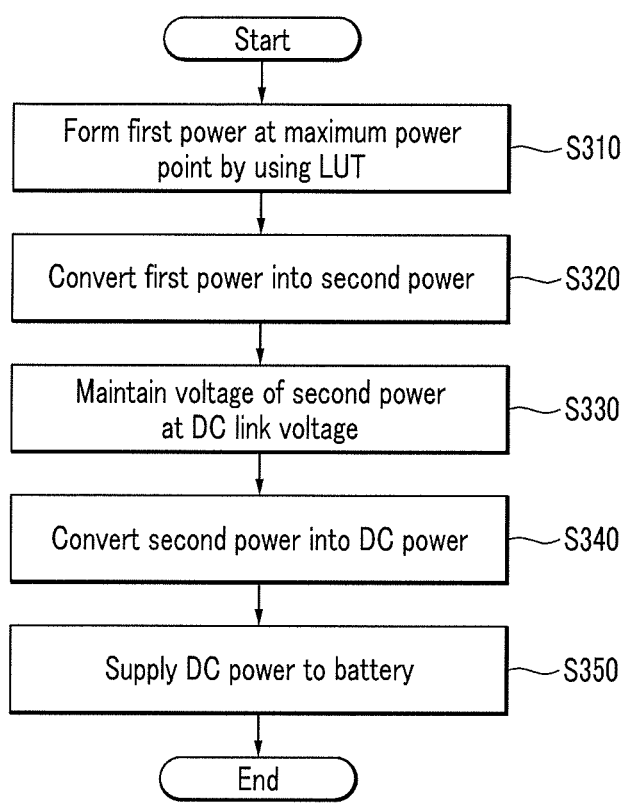
FIG. 7 is a flowchart illustrating an operation of the grid-tied power storage system according to an exemplary embodiment of the present invention.

FIG. 7 is a flowchart illustrating an operation of the grid-tied power storage system according to an exemplary embodiment of the present invention.

Referring to FIG. 7, there is shown an operating mode where power is supplied from the power generation system 130 to the power storage apparatus 120, from among the operating modes of the grid-tied power storage system 100.

The grid-tied power storage system 100 forms a first power at a maximum power point MPP by using a LUT at step S310. The first power is a maximum power point power Pmpp generated by the power generation system 130. As described above with reference to FIGS. 3 to 6, in a case where the power generation system 130 is a solar power generation system, the first power is formed in such a way as to decrease an output voltage Vpv of the solar cell module 131 from an open-circuit voltage Voc to a maximum power point voltage Vmpp in a soft-start manner and then perform MPPT control according to the P&O algorithm. Here, the open-circuit voltage Voc and the maximum power point voltage Vmpp are determined on the basis of a temperature T and solar radiation S of the solar cell module 131, and a correlation therebetween is stored in an LUT.

The first power conversion unit 111 of the grid-tied power storage system 100 converts the first power into a second power of DC at step S320.

The DC link unit 118 of the grid-tied power storage system 100 maintains voltage of the second power at a DC link voltage of a certain level at step S330.

The third power conversion unit 113 of the grid-tied power storage system 100 converts the second power, having the DC link voltage, into a third power of DC at step S340. The third power has voltage level suitable for charging the power storage apparatus 120.

The third power is supplied to charge a battery at step S350.

Figure 8:
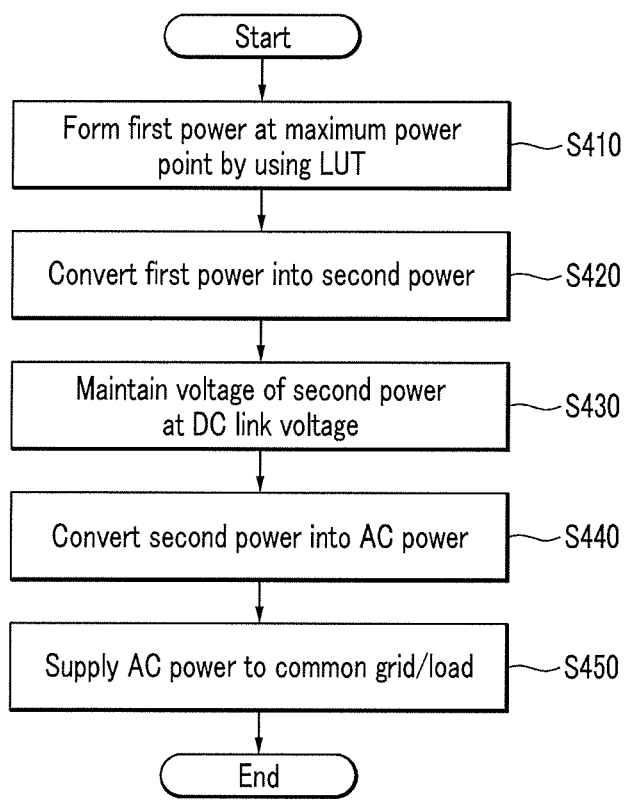
FIG. 8 is a flowchart illustrating an operation of the grid-tied power storage system according to another exemplary embodiment of the present invention.

FIG. 8 is a flowchart illustrating an operation of the grid-tied power storage system according to another exemplary embodiment of the present invention.

Referring to FIG. 8, there is shown an operating mode where power is supplied from the power generation system 130 to the common grid 140 or the load 150, from among the operating modes of the grid-tied power storage system 100.

The grid-tied power storage system 100 forms a first power at a maximum power point MPP by using an LUT at step S410. The first power is a maximum power point power Pmpp generated by the power generation system 130. As described above with reference to FIGS. 3 to 6, in a case where the power generation system 130 is a solar power generation system, the first power is formed in such a way as to decrease an output voltage Vpv of the solar cell module 131 from an open-circuit voltage Voc to a maximum power point voltage Vmpp in a soft-start manner and then performs MPPT control according to the P&O algorithm. Here, the open-circuit voltage Voc and the maximum power point voltage Vmpp are determined on the basis of a temperature T and solar radiation S of the solar cell module 131, and a correlation therebetween is stored in the LUT.

The first power conversion unit 111 of the grid-tied power storage system 100 converts the first power into a second DC power at step S420.

The DC link unit 118 of the grid-tied power storage system 100 maintains voltage of the second power at a DC link voltage of a certain level at step S430.

The second power conversion unit 112 of the grid-tied power storage system 100 converts the second power, having the DC link voltage, into a third AC power at step S440. The third AC power is AC power which may be supplied to at least one of the common grid 140 and the load 150 and complies with power quality criteria, such as a THD and a power factor of voltage and current of the common grid 140.

The third AC power is supplied to at least one of the common grid 140 and the load 150 at step S450.

The drawings and the detailed description of the embodiments according to the invention given so far are only illustrative, and they are used to describe the embodiments of the present invention, but not used to limit the meaning or restrict the scope of the present invention as described in the claims. Therefore, those having ordinary skill in the art will appreciate that various modifications or changes and other equivalent embodiments are possible from the exemplary embodiments. Accordingly, the true scope of the present invention should be determined by the following claims.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and their equivalents.

DESCRIPTION OF SOME OF THE REFERENCE NUMERALS

100: grid-tied power storage system
110: power management system
111: first power conversion unit
112: second power conversion unit
113: third power conversion unit
116: first switch
117: second switch
118: DC link unit
119: control unit
120: power storage apparatus
130: power generation system
140: common grid
150: load

What is claimed is:

1. An apparatus for tracking a maximum power point comprising:
a converter unit for converting a first power outputted from a solar cell module into a second power;
a sensing unit for detecting a temperature of the solar cell module and for detecting solar radiation of the solar cell module; and
a maximum power point control unit for searching stored data for a maximum power point voltage and an open-circuit voltage according to the detected temperature and the detected solar radiation of the solar cell module, decreasing voltage of the first power from the open-circuit voltage to the maximum power point voltage in a soft-start manner, and then performing Maximum Power Point Tracking (MDPT) control according to a Perturbation and Observation (P&O) algorithm.

2. The apparatus of claim 1, further comprising a Look-Up Table (LUT) unit for storing the maximum power point voltage and the open-circuit voltage as a function of the temperature and the solar radiation of the solar cell module, wherein the maximum power point control unit is configured to search the LUT unit for the maximum power point voltage and the open-circuit voltage corresponding to the temperature and the solar radiation of the solar cell module.

3. The apparatus of claim 1, wherein the sensing unit is configured to transmit the detected temperature and the detected solar radiation to the maximum power point control unit.

4. The apparatus of claim 1, wherein the maximum power point control unit is configured to regularly decrease an output voltage of the solar cell module to the maximum power point voltage by decreasing the output voltage per unit increment by a number of times of a system frequency during a soft start time.

5. The apparatus of claim 4, wherein the maximum power point control unit is configured to periodically determine whether or not there is a variation in the first power according to the Perturbation and Observation (P&O) algorithm, and the maximum power point control unit is configured to increase or decrease the output voltage by a set voltage when there is a variation in the first power so that the output voltage converges on the maximum power point voltage.

6. The apparatus of claim 5, wherein the set voltage is set to a value smaller than the unit increment.

7. A method of tracking a maximum power point, the method comprising:
detecting a temperature and a solar radiation of a solar cell module;
setting an open-circuit voltage and a maximum power point voltage from stored data according to the detected temperature and the detected solar radiation of the solar cell module;
regularly decreasing an output voltage of the solar cell module from the open-circuit voltage to the maximum power point voltage; and
maintaining the output voltage at the maximum power point voltage according to a Perturbation and Observation (P&O) algorithm.

8. The method of claim 7, wherein the setting of the open-circuit voltage and the maximum power point voltage from the stored data comprises searching a Look-Up Table (LUT) in which the maximum power point voltage and the open-circuit voltage as a function of the temperature and the solar radiation of the solar cell module are stored for the open-circuit voltage and the maximum power point voltage corresponding to the detected temperature and the detected solar radiation of the solar cell module.

9. The method of claim 7, wherein the regularly decreasing of the output voltage of the solar cell module from the open-circuit voltage to the maximum power point voltage comprises regularly decreasing the output voltage to the maximum power point voltage by decreasing the output voltage per unit increment by a number of times of a system frequency during a soft start time.

10. The method of claim 9, wherein the maintaining of the output voltage at the maximum power point voltage according to the Perturbation and Observation (P&O) algorithm comprises:
periodically determining whether or not there is a variation in power output from the solar cell module; and
when there is a variation in the power output from the solar cell module, increasing or decreasing the output voltage by a set voltage so that the output voltage converges on the maximum power point voltage.

11. The method of claim 10, wherein the set voltage is set to a value smaller than the unit increment.

12. A method of operating a grid-tied power storage system, the method comprising:
detecting a temperature and a solar radiation of a solar cell module, setting an open-circuit voltage and a maximum power point voltage from stored data according to the detected temperature and the detected solar radiation, and controlling a first power by regularly decreasing voltage of the first power from the open-circuit voltage to the maximum power point voltage in a soft-start manner;
converting the first power into a second power;
maintaining voltage of the second power at a DC link voltage;

converting the second power at the DC link voltage into a third DC power; and charging a battery with the third DC power.

13. The method of claim 12, wherein the controlling of the first power comprises:

detecting a temperature and a solar radiation of the solar cell module; and searching a Look-Up Table (LUT) in which the maximum power point voltage and the open-circuit voltage as a function of the temperature and the solar radiation of the solar cell module are stored for the maximum power point voltage and the open-circuit voltage corresponding to the detected temperature and the detected solar radiation of the solar cell module.

14. The method of claim 12, wherein the controlling of the first power comprises regularly decreasing the voltage of the first power to the maximum power point voltage by decreasing the voltage of the first power per unit increment by a number of times of a system frequency during a soft start time.

15. The method of claim 14, wherein the controlling of the first power further comprises decreasing the voltage of the first power to the maximum power point voltage and then maintaining the voltage of the first power at the maximum power point voltage according to a Perturbation and Observation (P&O) algorithm.

16. A method of operating a grid-tied power storage system, the method comprising:

detecting a temperature and a solar radiation of a solar cell module, setting an open-circuit voltage and a maximum power point voltage from stored data according to the detected temperature and the detected solar radiation, and controlling a first power by regularly decreasing voltage of the first power, outputted from the solar cell module, from the open-circuit voltage to the maximum power point voltage in a soft-start manner;

converting the first power into a second power;

maintaining voltage of the second power at a DC link voltage;

converting the second power at the DC link voltage into a third AC power; and supplying the third AC power to at least one of a common grid or a load.

17. The method of claim 16, wherein the controlling of the first power comprises:

detecting a temperature and a solar radiation of the solar cell module; and searching a Look-Up Table (LUT) in which the maximum power point voltage and the open-circuit voltage as a function of the temperature and the solar radiation of the solar cell module are stored for the maximum power point voltage and the open-circuit voltage corresponding to the detected temperature and the detected solar radiation of the solar cell module.

18. The method of claim 16, wherein the controlling of the first power comprises regularly decreasing the voltage of the first power to the maximum power point voltage by decreasing the voltage of the first power per unit increment by a number of times of a system frequency during a soft start time.

19. The method of claim 18, wherein the controlling of the first power further comprises decreasing the voltage of the first power to the maximum power point voltage and then maintaining the voltage of the first power at the maximum power point voltage according to a Perturbation and Observation (P&O) algorithm.

* * * * *